United States Patent

[11] 3,586,819

| [72] | Inventor | Carmen P. Cairelli<br>Farmington, Conn. |
|---|---|---|
| [21] | Appl. No. | 813,683 |
| [22] | Filed | Apr. 4, 1969 |
| [45] | Patented | June 22, 1971 |
| [73] | Assignee | Dynamics Corporation of America<br>New York, N.Y. |

[54] COMBINATION FOOD MIXER AND HEATER
4 Claims, 5 Drawing Figs.

[52] U.S. Cl. .................................................. 219/201,
219/209, 259/131
[51] Int. Cl. .................................................. H05b 1/00
[50] Field of Search .......................................... 219/200,
201, 316, 437, 209, 305, 491; 259/104, 131, DIG.
35; 416/36

[56] References Cited
UNITED STATES PATENTS

| 1,559,002 | 10/1925 | Plastino ........................ | 219/437 X |
| 1,692,270 | 11/1928 | Jensen ......................... | 219/523 X |
| 1,741,727 | 12/1929 | Naylor ......................... | 219/201 X |
| 1,845,692 | 2/1932 | Willat et al. .................. | 219/209 |
| 3,109,913 | 11/1963 | Galajda, Jr. .................. | 219/201 |
| 3,170,674 | 2/1965 | Gomersali et al. ............. | 259/1 |

FOREIGN PATENTS

| 450,324 | 7/1936 | Great Britain ................ | 219/201 |

Primary Examiner—R. F. Staubly
Assistant Examiner—C. L. Albritton
Attorney—Richard P. Schulze ABSTRACT: A combined food mixer and heater having standard beater elements together with solid electrical heating elements, both the beater elements and heating elements extending outwardly from the housing unit.

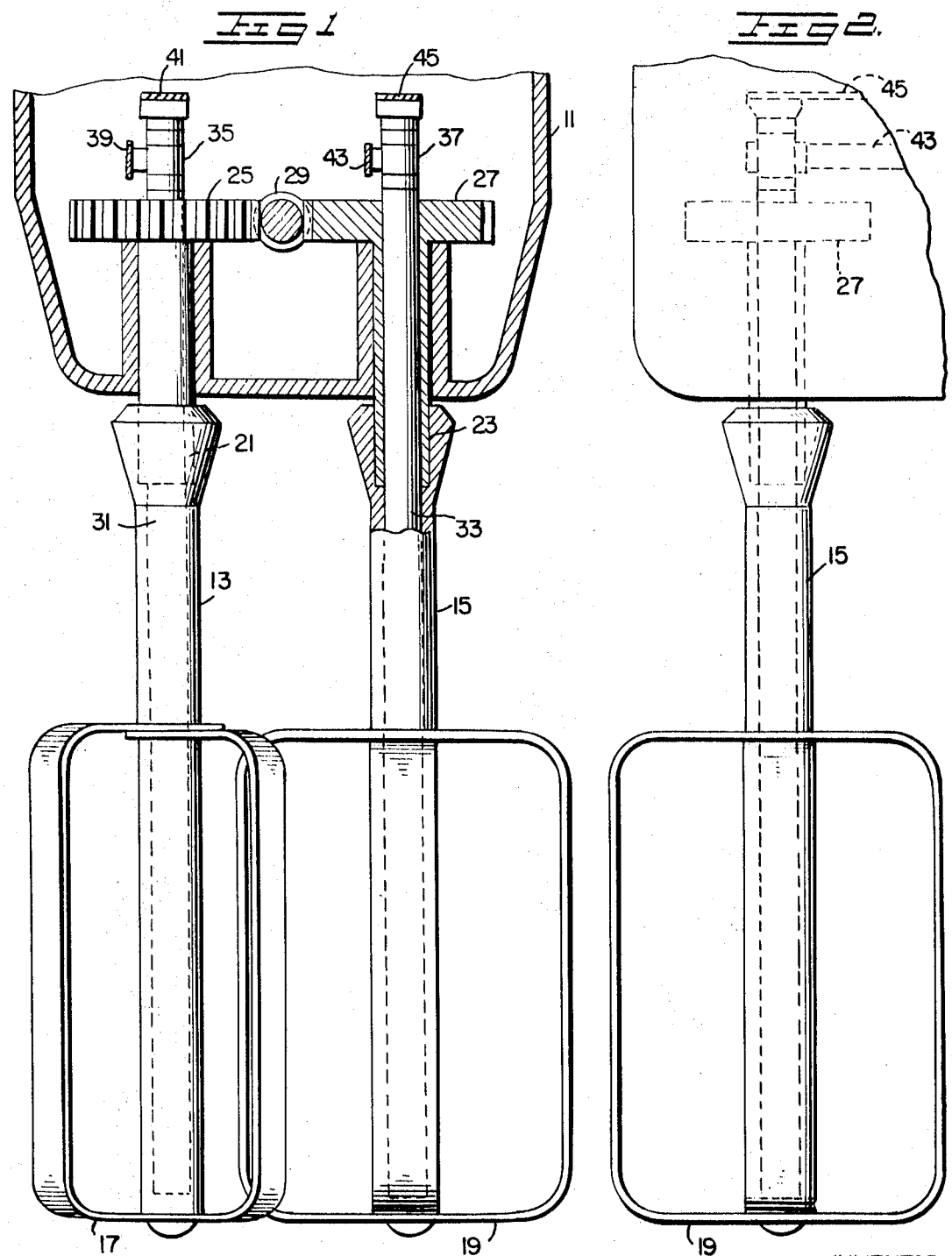

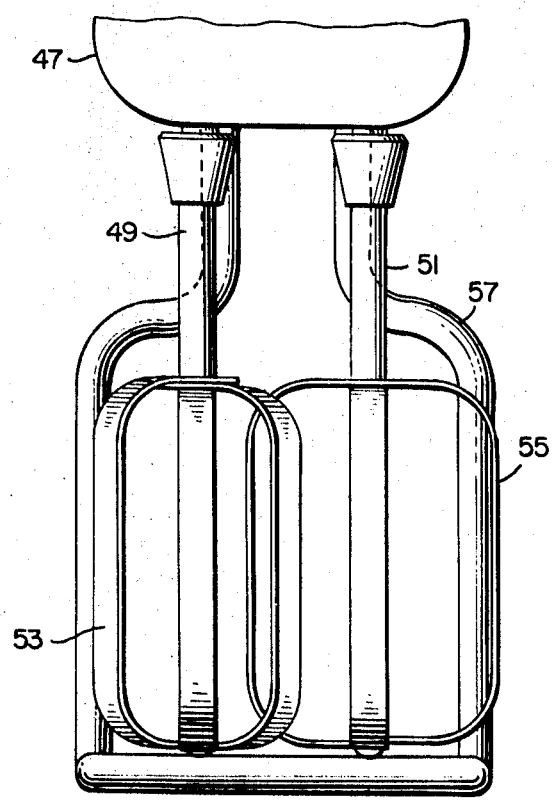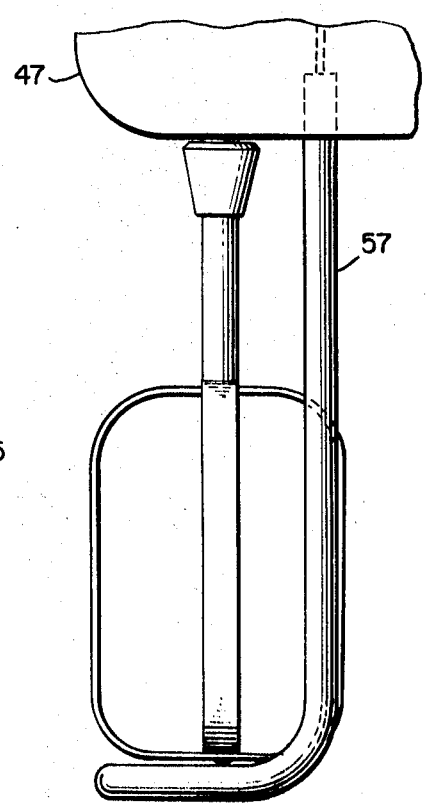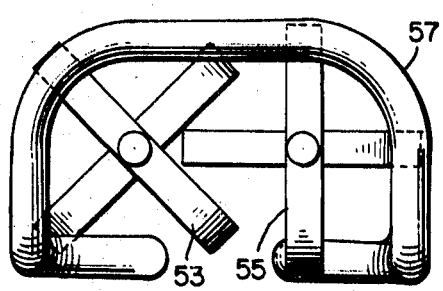

COMBINATION FOOD MIXER AND HEATER

The present invention relates generally to food mixers and more specifically to domestic food mixers having heating means combined therewith.

Domestic electrical mixers of both the stand and hand held portable type have become a standard item in the average home today. These mixers may be used for all types of mixing, stirring and agitating of foods and food products.

It is obvious that many of the foods which are so mixed or agitated also must be heated in some manner, or it is desirable to heat them in order to enhance their palatability. At the present time, to my knowledge, all of such heating means is accomplished extraneous from the mixing part of the food preparation. There have been proposed a number of devices for domestic mixing which incorporate some form of heat so as to at least warm the material being mixed. All of these heater-mixer combinations rely upon some means of heating the container or bowl in which the food ingredients are placed. This is either done by using a type of double boiler or incorporating electrical heating elements within the container itself.

The above type of heating limits the use for which the mixer is available and, further, makes the entire device quite large and bulky and therefore undesirable for domestic kitchen use.

An object of the present invention is to provide means for mixing foods while simultaneously heating them.

A further object of this invention is to provide an integral unit for simultaneously mixing and heating foods.

Yet another object of this invention is to provide a unit for simultaneously mixing and heating foods which may be used with any type of mixing bowl.

These and other objects of the invention will become apparent from the following description when taken in conjunction with the drawings wherein:

FIG. 1 is an elevational view partially sectionalized showing one embodiment of the present invention;

FIG. 2 is a side elevational view of the structure of FIG. 1;

FIG. 3 is an elevational view of a further embodiment of the present invention;

FIG. 4 is a side elevational view of the structure shown in FIG. 3; and

FIG. 5 is a bottom view of the structure shown in FIG. 3.

Broadly speaking, the present invention provides a standard mixer type housing with shafts extending outwardly therefrom and having blades attached to their outer ends, with means for rotating the blades counter to each other together with means extending from the housing for adding heat to the material which is being mixed. This heating means is an electrical heating element which is connected within the housing to an electrical power source.

Turning now more specifically to the drawings, there is shown in FIG. 1 a housing 11 having two hollow shafts 13 and 15 extending outwardly therefrom and terminating in mixing blades 17 and 19 which are attached thereto in a well-known manner. Shafts 13 and 15 are removably mounted on cylinders 21 and 23 by any well-known means. They are shown as being frictionally mounted thereto for simplicity's sake.

The cylinders 21 and 23 may be integral with gears 25 and 27 which in turn mesh with a worm gear 29. This worm gear is driven in a standard fashion through a shaft connected to an electrical motor (not shown).

Solid electrical heating elements 31 and 33 extend downwardly through the cylinders 21 and 23 and into the hollow shafts 13 and 15. In the configuration shown in FIG. 1, the heating elements rotate with the cylinders and the hollow shafts and extend above the cylinders and into the housing as indicated.

In the embodiment shown in FIGS. 1 and 2, the heating elements are rotating. Therefore, the electricity is supplied by means such as sliprings 39,41 and 43,45. It is to be understood that these elements could be of a size to fit within cylinders 21 and 23 without rotating therewith. In such a case, the sliprings would be eliminated and a standard electrical connection could be made to the heating element within the housing 11.

FIGS. 3 through 5 show another embodiment of the present invention.

Again, there is shown a housing 47 having the shafts 49 and 51 extending outwardly therefrom and terminating in beater blades 53 and 55. These blades may be driven in a standard fashion, such as that indicated in FIG. 1. Adjacent the blades and extending outwardly from the housing in substantially the same direction as the shafts 49 and 51, is a solid electrical heating element 57 which has a connection (not shown) within the housing which may or may not be removable in any standard fashion.

In the particular configuration shown in FIGS. 3 through 5, the heating element is formed in such a manner that it partially encloses the mixing blades 53 and 55. While it is desirable to dissipate the heat and extend it about the blades, the particular configuration of the heating element may be chosen so as to provide the most desirable heating in accordance with the blade construction which is being used.

It will now be obvious from the above discussion that the present invention provides a clean, neat and compact method of mixing and heating food ingredients at the same time. Further, regardless of whether this invention is used in a stand-type mixer or a hand portable mixer, there is no requirement for a special vessel containing any heating means. The housewife may use the mixer of the present invention, and particularly a portable hand mixer, with any of the standard mixing bowls in common usage.

It is to be understood that the above description and the related drawings are illustrative only since the basic concept of the invention may be practiced in various forms. Therefore, the invention is to be limited only by the scope of the following claims.

I claim:

1. A mixer for food and ingredients of foods comprising:
   an electrical motor,
   a housing for said motor,
   first and second shaft members extending downwardly from said housing, said shafts being substantially parallel and adapted to be simultaneously rotated in opposite directions,
   overlapping blade means including vertically extending laterally moving blades secured to the outer end portion of each of said shafts with the blades on one of the shafts rotatably interdigitating with the blades on the other shaft,
   vertically elongated electrical heating means with two spaced elements extending downwardly from said housing in the same direction as said shafts, each in close horizontal proximity to the blade means on a shaft for interaction therewith to provide therebetween a mixing zone supplied with heat from said heating means, and
   means for supplying electrical power to said heating element means and motor simultaneously.

2. The mixer of claim 1 in which said spaced elements vertically overlap substantially the length of said blades.

3. The mixer of claim 1 in which said spaced elements are integrally connected by a curved heater element portion bordering the major portion of the lower edge of the mixing zone of the beaters and the mixing zones between said heater elements and blades.

4. The mixer of claim 1 in which the spacing between the vertical heater elements and the paths of blades passing adjacent thereto are substantially less than the radius of the circle of movement of the blades.